May 23, 1967 — O. A. VIELI — 3,321,414

CELLULAR GLASS AND METHOD OF MAKING SAME

Filed July 20, 1964

May 23, 1967 O. A. VIELI 3,321,414
CELLULAR GLASS AND METHOD OF MAKING SAME
Filed July 20, 1964 3 Sheets-Sheet 3

United States Patent Office 3,321,414
Patented May 23, 1967

3,321,414
CELLULAR GLASS AND METHOD OF
MAKING SAME
Otto Anton Vieli, Rhazuns, Graubunden, Switzerland, assignor to Werner H. Kreidl, Vaduz, Liechtenstein
Filed July 20, 1964, Ser. No. 383,998
Claims priority, application Austria, May 18, 1961,
A 3,916/61; Jan. 10, 1962, A 176/62; Oct. 1, 1962,
A 7,737/62; July 19, 1963, A 5,810/63
17 Claims. (Cl. 260—2.5)

Prior art processes of producing foamed glass comprise heating glass powder, which contains oxidizing agents, such as sulfates, nitrates, arsenic or antimony oxide, and the like, in admixture with various organic or inorganic materials, usually carbon or carbonaceous materials, which develop gases at the softening temperature of the glass to sinter and expand the whole batch. Most of these processes depend on the special chemical composition and extremely small grain size of the glass powder used and on the purity of the gas developing substances, and they need many expensive molds made of heat resistant steel having strong walls which can resist the expansion pressure.

Furthermore the individual cells or pores of foamed glass produced by any of the prior art processes are surrounded and separated from each other by solid cell walls. For this reason and on account of the brittleness of glass, the conventional foamed glass can be machined only with difficulty. As a matter of fact machining of such foamed glass would be possible only with extremely thin cell walls in which case, however, the low compressive strength of the foamed glass would no longer meet with the commercial requirements. For this reason conventional foamed glass must generally be made in molds which correspond to the desired shape of the foamed glass body. This necessitates the manufacture and storing of a large number of molds.

The present invention relates to an improved cellular glass and to a method of making same.

The cellular glass of the present invention is characterized by the presence of micropores in the cell walls surrounding the macropores of the foam structure. These macropores are the pores which are present in the conventional foamed glass. They are surrounded and separated from each other by the relatively thin cell walls and constitute the foam structure.

The fact that micropores are embedded in the cell walls of the macropores of the cellular glass according to the present invention results in a number of important advantages:

It has been found that these micropores in the cell walls impart to the material a very good machinability in sawing, drilling and boring, milling and the like operations. Hence, this material enables the desired bodies of foamed glass or the like to be cut, sawn or milled from blocks and the need for stocking the molds for bodies of various shapes is eliminated. Nevertheless, compared with a conventional cellular glass body of the same density, the strength of the cellular glass body is not decreased but even increased, because the entire thickness of the material of the cell walls between the macropores remains the same, whereas the micropores impart a lattice-like cross-sectional structure to the cell walls.

Furthermore, the sound insulation is improved because the dynamic modulus of elasticity is reduced by the fact that the solid cross-section of the cell walls is divided into smaller solid cross-sections by the micropores.

The heat insulating property of the cellular glass material is also improved by the presence of the micropores, and for the same reason, the cellular glass material containing micropores is less susceptible to temperature fluctuations. Therefore the cooling-down of the bodies after they were heated to the foaming and sintering temperature can be carried out less carefully than with conventional materials.

Further advantages of the novel and improved cellular glass of the instant invention will become apparent later on.

The present invention also relates to a process for producing a cellular glass having the above characteristics.

The process according to the present invention comprises the steps of wetting ground glass with an aqueous solution containing an alkali-metal silicate and an organic substance, drying and/or subjecting the resulting mixture to preliminary roasting at a temperature below 600° C. (from 200° to about 600° C.), inflating the roasted material by heating it to its softening temperature, and allowing it to cool. The present invention is based on the recognition that the simultaneous use of an alkali-metal silicate and an organic compound in an aqueous solution renders the success of the process, more particularly the inflating operation, independent of the quality and composition of the ground glass and largely independent of the particle size of the same. Glass particle sizes of 0.1 to 0.2 mm. may be used without difficulty. It is even possible to use glass particles of a size up to 0.5 mm., provided only that a certain quantity of finely milled glass powder, namely at least 10% by weight of the whole mixture of glass powder with a grain size of below 0.035 mm. is admixed to the batch. When the mixture is being dried, the substances contained in the solution will dry on the glass particles so that the inflating substance is present in a fine division in the ground glass during the subsequent heating, which causes the inflation.

Essential advantages are obtained by subjecting the mixture to preliminary roasting at temperatures below 600° C., at which the inflating effect is not yet obtained. By this treatment, the individual particles of the ground glass are covered with a vitreous crust, in which high carbon compounds are embedded in a very fine division. This granulate or powder is then subjected to the actual inflating treatment. Owing to the intimate bond between the various gas-evolving substances and between these substances and the ground glass, the inflation was effected very rapidly, within a few minutes, in contrast to known processes. There are no differences from known processes regarding the subsequent slow cooling of the resulting glass foam. For the sake of higher strength, it is recommended to cool as slowly as possible, in dependence on the wall thickness of the resulting bodies, not only during the transformation range of the mixture but throughout the entire cooling step.

The alkali-metal silicate which is employed in the instant process is preferably a solution of commercially pure water-glass. This solution may be diluted if desired. To improve the wetting of the ground glass by the water-glass, the latter may have added to it 0.01-0.5 percent by weight, preferably 0.1 percent by weight, of an alkali-resisting wetting agent, such as oxydiphenyldisulphonate. The mixture may be rendered less compact to improve its workability during the roasting operation by the addition of solid, inflated alkali-metal silicate, known per se. For instance, 4–30 parts by weight of concentrated water-glass solution and, if desired, up to 5 parts by weight of solid, inflated water-glass are added per 100 parts by weight of ground glass.

It is interesting to note that the addition of substances which usually reduce the viscosity, other than alkali-metal silicate, is not successful. For instance, sodium aluminate in a ternary compound with silica tends to promote a refractory bond. Sodium borate is soluble in water only to an amount of 1½ percent in the cold and an admixture of the powder does not appear to result in a sufficiently fine division. Alkali-metal phosphates tend to increase the refractoriness of silicate glasses (only pure phosphate glasses are low-melting). Lead oxide reduces the melt viscosity too much so that the gases blow off; besides, it can only be added as a solid, is too heavy and too expensive on a weight basis; it is also poisonous. If substances such as sulphur or nitrates are added to the mixture, which influence the combustion of the carbon originating from the organic substances, the inflation will be inhibited and a light-colored, sintered or molten product rather than foamed glass will be obtained. If only a small amount is added, for instance, 0.2% by weight related to ground glass, a white to light-grey foamed glass will be obtained.

The alkali-metal silicate forming the base material of the foam-forming vitreous crust has two functions. It causes the formation of an intimate bond between the covering and the ground glass particles and embeds the very finely divided organic substance so as to exclude air so that this organic substance is cracked and does not begin to evolve carbon monoxide until a temperature above 500–600° C. has been reached. It is believed that this very fine division of the organic substance results in the formation of the micropores in the cell walls of the macropores during the inflation proper. These micropores have a diameter up to $\frac{1}{10}$, preferably $\frac{1}{100}$ to $\frac{1}{1000}$, of the diameter of the macropores.

It is particularly advantageous to combine the alkali-metal silicate with an organic substance which in a very fine division, preferably in a true or colloidal solution or as a highly peptized powder, is compatible with the highly alkaline waterglass and is not sublimated at the roasting temperature. The use of polyhydric alcohols or carbohydrates such as sugar, glycol, glycerol, cellulose, starch, wood flour and the like has proved particularly recommendable. Other water- and/or alkali-soluble substances, such as precondensates of urea formaldehyde or of phenol formaldehyde, or bitumen emulsions, may be used for this purpose and are available at very low cost because they are industrially produced on a very large scale. It is suitable to add about 0.3 to 10 parts by weight of organic substances per 100 parts by weight of ground glass.

It is interesting to note that alkali-metal silicate and an organic substance alone form a foamable granulate, which seems to be satisfactory, but collapses during a subsequent inflating treatment. Any ground glass, however, which is present, will be included in the melt, even if it has a relatively large particle size. The activity is also shown by the fact that perlite spherules, which normally react with glass only at fairly high temperatures, are completely included in the melt in the present case at 800° C. For decorative reasons, however, it is desired that the perlite should be stable at the inflating temperature, which is lower in the present case.

It is characteristic of the process that a glass particle is made first which is covered by a mixing operation with an intimate mixture of such organic substance in an aqueous solution of an alkali-metal silicate, and that the subsequent drying or preliminary roasting transforms the aqueous covering into a solid, vitreous crust so that a particle is obtained which contains carbonaceous or carbonizable substances in a very fine division in an outer layer. During a roasting treatment at elevated temperature the carbonizable or carbonaceous substances will be cracked and remain enclosed in the gas-evolving alkali-metal silicate crust. Any gases evolved will not escape but remain in the form of minute gas bubbles in the vitreous outer layer on the glass particles. During this roasting treatment, only a very slight sintering is desired and the particles should remain substantially freely movable. It is suitable but not always necessary to subject the resulting particles to a grinding operation, particularly in order to separate particles which have sintered together.

According to the invention, the process may be carried out in such a manner that the moist mixture is heated at a temperature between 300° and 600° C., preferably about 500° C., for 1 to 10 minutes, for instance, in a rotary kiln, and is then cooled to form a pregranulate of agglomerated ground glass particles covered by a crust which contains water-glass and carbon. This pregranulate may be ground to a particle size below 0.5 mm. before its further processing.

If the pregranulate obtained by the preliminary roasting is crushed to a particle size of, e.g., 1–2 mm., it will have an apparent specific gravity of 0.75–0.80 kilograms per liter. Ground glass which would foam by no means with other agents will be foamable up to 300 percent by volume after this treatment. The intimate bond between the foam-forming covering and the ground glass particle, the surface of which already contains diffused alkali-metal silicate, reduces the viscosity of the supporting glass so that the actual foaming may be carried out at temperatures which are lower than usual by about 100° C.

According to the invention the process may also be carried out in such a manner that the pregranulate is heated very rapidly to a temperature between 660° and 760° C. to inflate the mass, which is subsequently slowly cooled. In the process according to the invention the formation and cooling of the pregranulate may be effected in a separate operation, which may be followed by reheating to effect the actual inflation. Admixtures may be added, if desired, to the pregranulate. Alternatively, the two steps of covering the ground glass particles with a foam-forming crust and the formation of a foam-forming granulate and the subsequent actual inflating step may be carried out in an uninterrupted sequence and in the same furnace, if desired. It is essential for the preceding mixing step to result in a uniform wetting of the ground glass particles with the solution of the substances which subsequently form the foam-forming crust.

If it is intended to admix untreated ground glass or other admixtures to the pretreated ground glass during the inflating step, it will be suitable to grind the roasted pregranulate to a particle size below 0.5 mm. before its further treatment. In this case up to 30 percent by weight of untreated ground glass, ground foamed glass waste or ground basalt and/or ground slag, and up to 60 percent by volume of light-weight, heat-resisting admixtures, such as expanded mica or perlite, inflated clay or the like, may be admixed. For instance, the activated ground glass causes ground slag having a melting point at 1400° C. to be included in the melt at 780° C. It has proved desirable to wet such admixtures previously with a dilute solution of water-glass in order to ensure a better mixing and adhesion of the foam-forming granulate and the other ground substances to the surface of these admixtures and to avoid a segregation during the movement of the mass through the inflating furnace.

It has been found that an addition of more than two parts by weight of organic substance and more than 15 parts by weight of alkali-metal silicate results in the formation of a dark grey to black glass foam, the ground waste of which may be used for repeated inflation instead of the pregranulate. If only ground waste is used, the inflating temperature must be increased by 10–20° C. above that of the first inflating treatment to ensure an expansion. This effect is entirely unknown in connection with the previous foamed glass materials and appears to be due to the fact that a rapid heating during the actual inflating step is enabled by the use of the ground glass pretreated according to the invention (pregranulate) and causes only a part of the active portions to be inflated so that the remaining, unused active portions remain available for subsequent inflating processes. This advantage enables a continuous operation, which may be carried out in open molds, if desired, or without any molds, because any waste obtained by trimming may be re-used.

The addition of less than one part by weight of organic substance and less than 10 parts by weight of alkali-metal silicate, however, will result in a white to light grey foamed glass, the ground waste of which has no longer any inflating power and may be admixed to the material to replace the ground glass rather than the foam-forming granulate. Such white to light-grey foamed glass may be coloured according to the invention by an addition of heat-resisting inorganic pigments, such as cobaltic oxide, chromic oxide, titanium dioxide or the like.

The wetting of the ground glass with the solution containing the alkali-metal silicate and the organic substance may be effected, if desired, by mixing in a positive or pan-type mixer in order to ensure optimum and uniform wetting and distribution.

Foamed glass in the form of blocks or bodies of any desired shape may be obtained by the inflating step. It is not necessary to use closed molds and pressure. Foamed glass may be obtained in any desired molds and even in the form of continous blocks or without any molds. During the inflating step, the pregranulate agglomerates to form the bodies or blocks. In this way a foamed glass body having the desired shape and size is obtained. If the pregranulate, which may have agglomerated to form particles of different size, is crushed before being inflated, the resulting foamed glass body will have a greater homogeneity.

According to a further embodiment of the present invention the mixture consisting of the ground glass and the aqueous solution containing the alkali-metal silicate and the organic substance is disintegrated while it is still in a moist state to form uniform, small compacts or pellets, which are subjected to preliminary roasting to form a pregranulate. By the action of heat, the granulate formed from the pellets is then inflated to form spherical foamed glass particles, which may then be subjected to further processing. It has been found that the moist mixture bonded by the alkali-metal silicate (e.g. water-glass) can be shaped in a simple manner to form small pellets, which determine the particle size of the granulate. These pellets may be made, e.g. by extruding the mixture by a screw through a die having a plurality of orifices and dividing the emerging extrusions. These compacts or pellets resist deformation in the moist state and are slightly sintered during the preliminary roasting so that these pellets retain their shape and in this state may be subjected to inflation, which will then result in spherical foamed glass particles. The moist mixture may be pressed to form pellets 1–2 mm. in diameter. This diameter is increased about five times by inflating and the spherical shape is obtained as the result of the gas pressure in these particles.

Granulation to obtain particles having a predetermined size may also be effected by wetting porous inorganic particles, which are stable at the inflating temperature, such as perlite (inflated lava mineral) or vermiculite (inflated mica), with an aqueous solution which contains an alkali-metal silicate and an organic substance, followed by dusting with ground glass. Instead of having open pores, as in other cases, the products obtained by roasting and inflating are moisture-tight and even gas-tight and may be used for many purposes for which they were previously unsuitable, for instance, in a mixture with bitumen for the insulation of roofs.

It has proved advantageous to mix ground glass having a coarser particle size, for instance, in a range of 0.1 mm. to 1 mm., with at least 10 percent by weight of finer ground glass having, e.g., a particle size below 0.035 mm., and to mix this mixture with the aqueous solution of the alkali-metal silicate and an organic substance. The different particle size of the ground glass will then result in a better coherence of the pellets.

Before, the preliminary roasting, the pellets may be covered with fine, dry, ground glass, for instance, by tumbling. This will reduce the relative moisture content of the pellets before the preliminary roasting to reduce the tendency of the pelllets to agglomerate, particularly when a higher moisture content was required for pelleting.

To avoid waste, any dust obtained in addition to the foamed glass particles formed from the pellets is wetted with 5–20 percent by weight of a water-glass solution diluted at a ratio of 1:1, and the mixture is re-formed into pellets and subjected to preliminary roasting.

During the inflating treatment proper, the inflated particles should be consolidated in themselves by sintering whereas an agglomeration of the individual particles or pellets should be avoided. In a preferred embodiment the compacts are heated to the inflating temperature by contacting them with the surface of a bath, which has been heated to the inflating temperature of 800–900° C., particularly a metal bath, and by moving them relative to the bath surface, if desired. The bath may consist of a bath of lead or aluminum, the latter being preferable. By the application of the pellets to be inflated to a liquid bath surface, the mechanical stress of the particle surface is minimized and agglomeration is avoided. To reliably avoid an agglomeration of the pellets, it is preferred to dust them with a powder material which is incompatible with the fusing glass and the molten material of the bath at the inflating temperature, such as graphite, petroleum, coke, Portland cement, sintered corundum, bentonite and the like, or a mixture of such substances; alternatively pellets may be embedded into the same volume of such a powder material.

The pellets may be displaced in the longitudinal direction of the metal bath by means of a conveyor belt which is disposed above the bath surface and provided with scrapers. Alternatively, the inflating pellets disposed on the surface of the bath may be conveyed by a screen, which is disposed below the bath surface and periodically emerges slightly above the surface of the bath. According to another alternative, a circulation of the surface of the metal bath may be maintained by electric induction so that the metal bath with the granulate layer is moved across the bath.

In the above embodiment of the invention the pellets are suitably maintained adjacent to the bath surface of 0.5 to 5 minutes to heat the pellets. If the pellets are displaced in steps over the bath surface during this time, it is suitable to give the bath an elongated configuration. The pellets are desirably moved over the bath surface in a layer having a height of one particle. However, if an agglomeration of the pellets has been prevented by dusting them with suitable materials, the layer of pellets may be higher. In this case it is desirable, however, to provide for a motion within the layer. The bath being contained in a closed furnace, the temperature required for inflating prevails also above the bath surface. Because the individual pellets are inflated to five times their diameter, the height of the layer will be automatically increased if the individual pellets are applied to the bath surface in a closely spaced arrangement at the beginning of the process. Owing to the increase of the volume of the inflating particles, the same will tend to pile up. If this is to be avoided, the uninflated particles must not cover the entire bath surface at the beginning of the process. To effect a slow cooling in the annealing range of the glass, it has been found suitable to move the foamed glass particles for a short time, for instance, 1–10 minutes, through a zone which is so heated that the particles are cooled somewhat (20–30° C.) below the strain point of the glass (e.g., 520–530° C.). The foamed glass particles thus obtained are largely free of internal stresses and for this reason are particularly suitable for the manufacture of insulating materials having a foamed structure and containing such foamed glass particles embedded in foamed plastics.

The spherical foamed ground glass particles made according to the invention differ from the spherules previously known from U.S. patent specification No. 2,691,248 in that their pore structure is uniform substantially throughout their cross-section. The cell walls contain micropores and the outer skin of the spherules is not thicker, than an internal cell wall and may even contain micropores, too. The same applies to the covering of particles made by granulating with the aid of inorganic porous bodies, such as perlite (inflated lava mineral) or vermiculite (inflated mica), with the difference that such spherical particles contain a core of the foreign matter.

The spherical foamed glass particles made according to the invention can be used for manifold purposes. They may be used in bulk as a filler for cavities to provide good insulation against heat and sound. They may also be used for making insulating material in the form of slabs, blocks, etc. For instance, such spherical foamed glass particles may be embedded in a glass foam in order to form an insulating body, in which the glass foam contains spherical foamed glass particles having low apparent specific weight and high insulation value. For this purpose the foamed glass particles, either as such or with a covering of ground glass and an aqueous solution containing alkali-metal silicate and an organic substance, are charged in bulk into open or closed molds and re-heated so that they are inflated and agglomerate to form shaped bodies. The foamed glass particles are suitably covered by superficially wetting them with an aqueous solution containing an alkali-metal silicate and an organic substance, followed by dusting with ground glass. Because the agglomerated particles are different, in spite of the fact that the basic material is the same, the resulting shaped bodies may be considered to have a certain degree of heterogeneity. This results in an improved resistance to temperature changes compared to homogeneous foamed glass bodies so that the inflated bodies may be cooled rapidly without setting up excessive internal stresses, which would result in cracks. This is particularly applicable to foamed glass particles which have been granulated around inorganic, porous particles, such as perlite (inflated laval mineral) or vermiculite (inflated mica).

The spherical foamed glass particles according to the invention may be embedded to special advantage in a material of different kind, such as synthetic resin, particularly a synthetic resin foam. For this reason an insulating material comprising spherical foamed glass particles made by the present process is essentially characterized according to the invention in that the foamed glass particles are embedded in a synthetic resin foam, particularly in a foam of polystyrene, phenolic, polyurethane, polyester or polyether resin. The proportions of the synthetic resin foam and the spherical foamed glass particles may vary so that synthetic resin or the spherical foamed glass particles may constitute a major part of the insulating material. A particularly good insulating material will be obtained according to the invention if the synthetic resin foam is contained in the insulating material only in that amount which is required for bonding the foamed glass particles so that this insulating material consist substantially of the spherical foamed glass particles, the interstices between these particles being filled by the synthetic resin foam.

Such an insulating material which contains foamed glass particles embedded in a synthetic resin foam is characterized by a particularly high insulation value. Compared to an insulating material which consists only of synthetic resin foam it has the advantage of higher strength, improved heat resistance and reduced shrinkage. Compared to an insulating material consisting only of foamed glass it has the advantage of higher elasticity owing to the resilient embedding of the foamed glass particles in synthetic resin foam and lower apparent specific gravity because the synthetic resin foam is usually lighter in weight than the glass foam.

The spherical foamed glass particles embedded in the synthetic resin foam have generally a diameter of about 1–10 mm. Glass spherules or particles of the conventional foamed glass would render machining of the insulating material by sawing, drilling or boring very difficult or would even prevent such machining, particularly if such particles or spherules are closely spaced. The foamed glass particles made according to the invention, however, have micropores extending through the cell walls between the macropores and the structure of such particles presents virtually no resistance to machining because the micropores in the cell walls define points of intentional weakness and readily enable machining of the foamed glass.

For a more complete understanding of the present invention, reference is made to the following illustrative examples, in which the parts and percentages are by weight. The invention, however, is not restricted to these examples.

*Example 1*

10 kg. of ground glass made by grinding bottle glass to less than 0.2 mm., and 0.25 kg. of inflated alkali-metal silicate having an apparent specific weight of about 0.06 kilogram per liter are intimately mixed with a solution consisting of 2 kg. of water-glass having a density of 1.4; 1.5 litre of water, 0.3 kg. of sugar and 30 grams of a wetting agent (oxydiphenyldisulfonate). The mixture is heated in a rotary kiln at about 550° C. for 5 minutes, rapidly cooled and ground to a particle size of less than 0.5 mm. A dark-grey powder is obtained, in which all glass particles are covered with a foamlike crust.

This grey to black granulate is charged, in an open mold of iron, into a furnace heated to about 700° C. and is heated to 730° C. and held at this temperature for one hour. After slow cooling during about 18 hours, the material is removed from the furnace at about 50° C. and removed from the mold.

A dark-grey to black foamed glass body is obtained, which does not develop any odor when being sawn apart, and which, under the microscope, exhibits a highly uniform structure with numerous micropores in the internal cell walls.

*Example 2*

The foamed glass bodies made according to Example 1 are ground to a particle size of 0.75 mm. and heated as described in Example 1 to 750° C. The characteristics of the resulting body are similar to those described in Example 1.

*Example 3*

6 parts by weight of the granulate made according to Example 1 are intimately mixed with 4 parts by weight of untreated ground glass and heated as described in Example 1 to 740° C. A foamed glass of good quality is obtained.

*Example 4*

10 kg. of ground glass are intimately mixed with a solution consisting of 1 kg. of water-glass, 2 litres of water, 0.1 kg. of sugar, 20 grams of a wetting agent and 0.4 kg. of inflated alkali-metal silicate and processesd as described in Example 1 to form a granulate. This granulate is somewhat lighter in colour than that obtained according to Example 1. Inflating of this granulate as described in Example 1 results in a light-grey foamed glass. Grinding this product and reheating it to 750° C. will not result in inflation.

*Example 5*

10 kg. of ground glass are thoroughly wetted with a solution of 2.5 kg. of water-glass, 1 litre of water, 0.2 kg. of sugar and 20 grams of a wetting agent and processed to form foamed glass directly by heating to 730° C.

Example 6

10 kg. of ground glass are mixed with a mixture of 0.9 kg. of water-glass and 0.3 kg. of concentrated glycerol and processed as described in Example 5 to form foamed glass. The resulting bodies are particularly dark and have a large number of micropores in the internal cell walls.

Example 7

10 kg. of ground glass and 0.25 kg. of inflated alkali-metal silicate are processed with a mixture consisting of 1.5 kg. of waterglass, 1.5 litre of water, 0.5 kg. of fine wood flour and 30 grams of a wetting agent and are inflated by a heat treatment as described in Example 5. The resulting foamed glass is somewhat lighter in color and has coarser pores than that obtained in Example 1.

Example 8

10 kg. of ground glass and 0.25 kg. of inflated alkali-metal silicate are mixed with a solution of 1.5 kg. of water-glass, 1.5 litre of water, 0.3 kg. of an alkali-soluble phenolic resin and 30 grams of a wetting agent and roasted to form a pregranulate. Inflating is effected as described in Example 1.

Example 9

10 kg. of ground glass and 0.25 kg. of inflated alkali-metal silicate are processed with a mixture consisting of 1.5 kg. of water-glass, 1.5 litre of water, 30 grams of a wetting agent and 0.5 kg. of an alkali-resisting bitumen emulsion and roasted to form a pregranulate. Inflating results in a foamed glass, which is relatively light in color.

Example 10

7 kg. of the pregranulate made according to Example 1 are mixed with 3 kg. of vermiculite of a particle size of 2–5 mm. and which has been moistened with a mixture of 0.7 kg. of water-glass and 1 litre of water. The vermiculite particles are thus covered with the foam-forming granulate. After drying, inflating is effected at 740° C. in open molds of iron for one hour. A body similar to rock is obtained. When this body, which contains vermiculite, has been ground, the material cannot be re-inflated.

Example 11

6 kg. of the granulate made according to Example 1 are mixed with 4 kg. of perlite, which has been pretreated with 0.3 kg. of water-glass and 0.5 litre of water. The mixture is dried. Inflating as described in Example 1 results in a body similar to rock.

Example 12

4 kg. of a granulate produced according to Example 1 are mixed with 6 kg. of the ground, perlite-containing foamed glass made according to Example 11 and the mixture is heated as described in Example 1 to 700° C. The resulting surface has a very high permeability to gas (about 1000 nanoperm) and an unsatisfactory strength and may be used for filtering purposes.

Example 13

5 kg. of a granulate obtained according to Example 1 are intimately mixed with 5 kg. of inflated clay, which has been moistened with 0.3 kg. of water-glass and 0.2 litre of water. The mixture is heated according to Example 1 to 720° C. The resulting body is somewhat heavier and has very high mechanical strength and a lower permeability to gas.

Example 14

10 kg. of ground glass and 0.3 kg. of inflated alkali-metal silicate are processed according to Example 1 with a solution consisting of 1 kg. of water-glass, 2 litres of water, 0.1 kg. of sugar and 30 grams of a wetting agent to form a pregranulate.

1 kg. of this pregranulate is inflated according to Example 1 with 0.5 kg. of ground glass and 1 kg. of perlite, with an addition of 30 grams of cobaltic oxide. The resulting body shows optical activity and comprises white particles embedded in a blue, vitreous matrix. This body is highly suitable for decorative purposes.

Example 15

10 kg. of ground glass are thoroughly wetted with a solution of 2.5 kg. of water-glass, 1 litre of water, 0.2 kg. of sugar and 20 grams of a wetting agent. The resulting pulpy mixture is granulated, for instance, by extruding the mixture by a screw through a multiple orifice die and cutting the emerging extrusions apart. This results in particles (pellets) about 1–2 mm. in diameter. These particles or pellets are heated in a rotary kiln at temperature between 300° and 600° C., approximately 400° C., for 2 minutes and are then cooled. This results in slight sintering, by which a certain resistance to deformation is imparted to the particles. The granulate which has thus subjected to preliminary roasting is embedded in the same volume of Portland cement in order to avoid agglomeration during the subsequent inflating step. This mixture is then applied to the surface of a liquid aluminum bath having a temperature of 780–790° C., and in a layer having a height of one particle, is displaced in steps on the bath surface. The which has thus been subjected to preliminary roasting is granulate is maintained in contact with the bath surface for about 3 minutes. The action of heat causes the individual particles of the granulate to inflate to spherical foamed glass particles, which have a diameter of 5–10 mm. These foamed glass spherules are then cooled. Cooling may be effected in contact with the air and it is not necessary to adopt special steps, such as the use of tunnel kilns, to ensure slow cooling. This thermal resistance of the foamed glass particles is due to the fact that the cell walls between the macropores contain micropores so that the cell walls can take up the thermal stresses set up during a rapid cooling. The spherical foamed glass particles thus obtained may be used for various purposes.

Example 16

A mixture of ground glass, water-glass, water, sugar and wetting agent, according to the mixture specified in Example 15 is granulated to form particles or pellets about 1.5 mm. in diameter. The granulate is dried whereupon it may be stored for any desired period of time.

The granulate is fed into a rotating tubular furnace having a length of 150 cm. and an inner diameter of about 25 cm. and rotating at about five revolutions per minute. The granulate is made to pass the furnace within 4–5 minutes. Before entering the furnace, the granulate is treated by dusting with finely ground clay (bentonite) in order to prevent agglomeration of the individual particles.

The foam glass particles thus obtained is about 6–15 mm. in diameter. They could be compressed between parallel plates to less than 80% the original diameter, without cracking. The specific weight of the granulate obtained was found to be 130–180 kg. per cubic metre; its compressive strength was greater than 30 kilograms per square centimeter. It can be used at temperatures between −200 and 450° C. without being susceptible to thermal shocks.

Example 17

1 kg. of a polystyrene foam product, such as "Styropor," is mixed with 10 kg. of the foam glass particles produced according to Example 16 and with 500 grams of an adhesive known per se. The resulting mixture is filled into a mold of any desired shape. By the application of heat, the Styropor material is inflated and there is formed a body wherein foam glass particles are embedded in a Styropor foam matrix.

The accompanying drawings will further illustrate the present invention.

Figure 1:
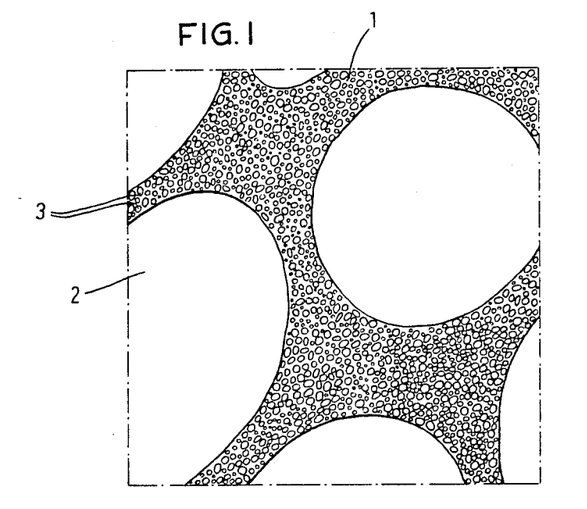
Figure 2:
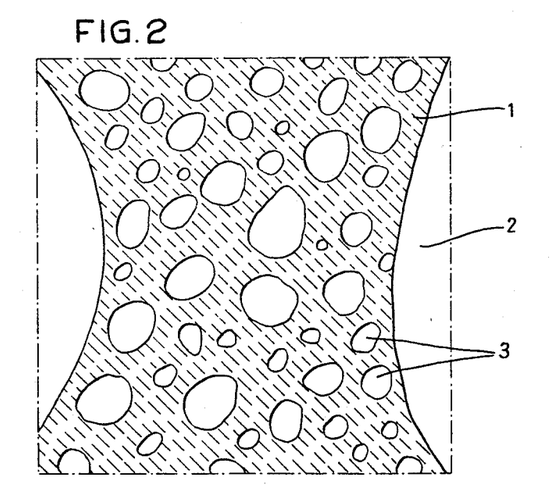

FIGS. 1 and 2 of the drawings show cross-sections of a foam glass made according to the present invention, FIG. 2 showing an individual cell wall at enlarged scale. The glass material is designated by the numeral 1, whereas the numerals 2 and 3 designate the macropores and the micropores, respectively.

Figure 3:
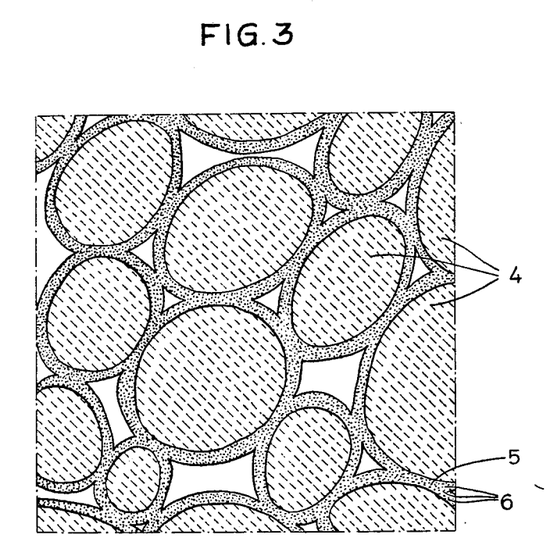

FIG. 3 shows a cross-section of an agglomerate made according to the first step of the present invention, i.e. by heating ot a temperature below 600° C. a mixture cf ground glass and a solution containing an alkali-metal silicate and an organic substance, such as sugar. The said agglomerate comprises glass grains 4 covered with a layer of solid alkali-metal silicate 5 having embedded therein particles 6 of carbonaceous material. This agglomerate, when being heat-inflated, will result in the formation of a foam glass structure as shown in FIGS. 1 and 2.

Figures 4, 5:
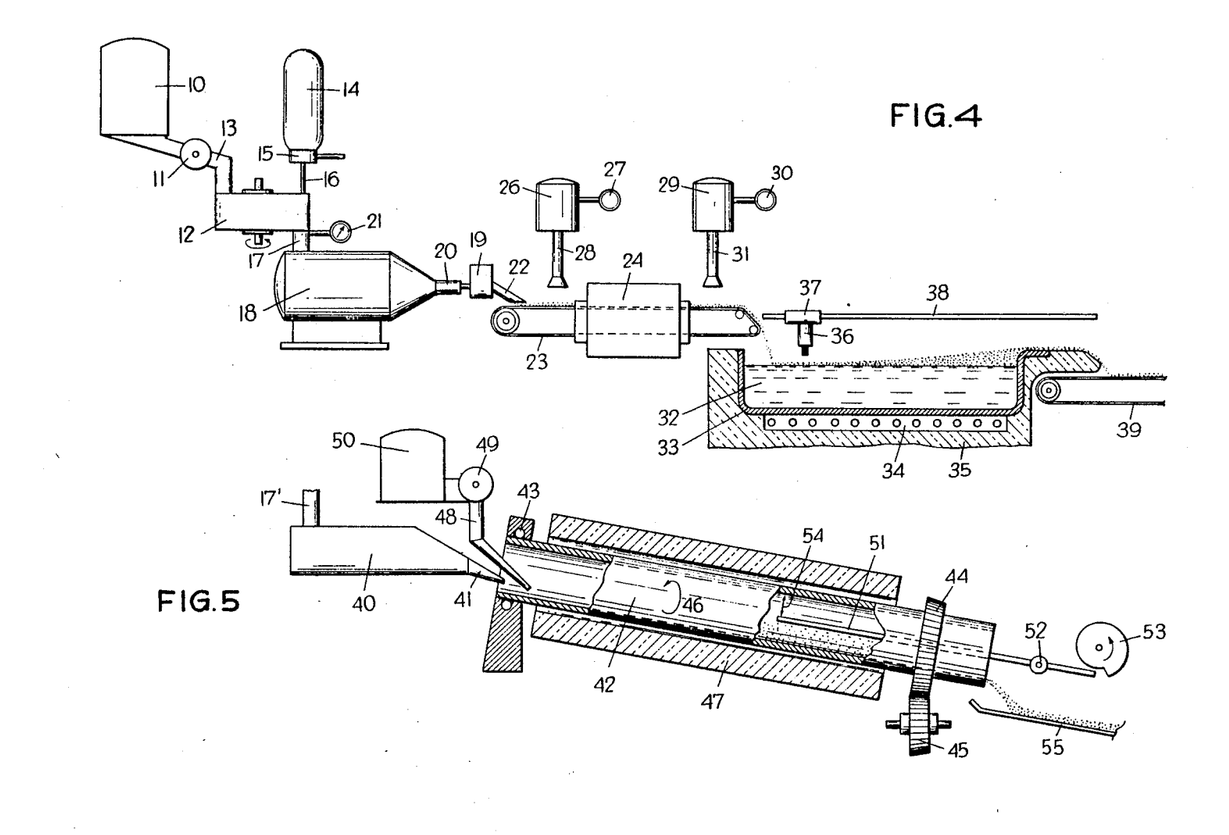

FIGS. 4 and 5 shows two embodiments of an installation designed to produce individual foam glass pellets as described in the foregoing Examples 15 and 16, respectively.

Referring to FIG. 4, the numeral 10 designates a storage bin containing ground glass. The ground glass is conveyed in controllable quantities from the storage bin 10 by way of a dispensing device 11 of known construction and a pipe 13 to a rotary mixer 12. A solution, e.g. an aqueous solution, containing an alkali-metal silicate, such as water-glass and an organic substance, such as sugar, is stored in a container 14. A predetermined quantity of said solution is continuously fed into the rotary mixer 12 by way of a dispensing device 15 and a pipe 16. In the mixer 12, the solution is intimately mixed with the ground glass to form a pasty mass. The resulting mixture or mass is continuously fed through pipe 17 into a granulating device 18, which in the present case is formed by an extruding press of known construction, equipped with a subdividing device 19 located at the delivery end of the press. The pipe 17 connecting the mixer 12 with the granulating device 18 is provided with a measuring instrument 21 for measuring and controlling the water content of the mixture or mass.

The crude granulate being formed from the mixture or mass by the subdividing device 19 leaving the extruding press, consists of particles or pellets about 1 mm. in diameter. These particles or pellets do not show any tendency to agglomerate. The crude granulate is conveyed over a great number of parallel chutes 22 onto a slowly moving endless belt 23 by means of which it is moved through a furnace 24. the inside temperature of which is about 400 to 600° C. When passing the furnace, the granulate is spread over the entire width of the conveyor belt 23 in a single layer. The speed of the conveyor belt 23 and the length of the furnace 24 are such that the granulate will be roasted in the furnace 24 for a few minutes. If desired, the granulate may be dusted on with glass powder or some other suitable powdered material, prior to the entry into the furnace 24, in order to avoid any adhesion of the individual particles. The glass powder or other suitable powdered material, which is contained in a bin 26, is dusted onto the granulate by means of a compressed-air device 27 by means of a pipe 28.

As has been mentioned above, the roasting of the crude granulate, although desirable in some cases, is not compulsory. In the case where such roasting step is not provided for, the furnace 24 is omitted, the granulate coming from the granulating device 18 being directly fed by the conveyor belt into the expanding device which will be described later on. Furthermore, other roasting devices of known construction, such as a rotary furnace, may be employed instead of the conveyor belt 23 and the furnace 24.

When employing the installation shown in FIG. 4, the roasted granulate is conveyed in a single layer of individual particles by the belt 13 from the furnace 24 to an expanding device consisting of a molten metal bath. In some cases it may be suitable to dust on the granulate, prior to its entry into the expanding device, with some suitable powdered material, such as powdered glass. In this case, said powdered material, which is stored in a bin 29, is dusted onto the granulate by means of a compressed-air device 30 through a pipe 31.

The metal bath 32 is contained in a shallow tub 33 which is equipped with a heating device 34 embedded in insulating material 35. The metal bath 32, the width of which is equal to the width of the conveyor belt 23, consists e.g. of molten lead or molten aluminum, the latter being preferred. The granulate is fed onto the surface of the metal bath 32 by means of the conveyor belt 23. Said granulate will float on the surface of the metal bath without being wetted by the metal. A scraper 36 being attached to a carriage 37 reciprocatingly movable along a slide 38, serves for conveying the granulate over the metal bath in a direction towards the right end of said bath. Neither the molten metal nor the scraper 36 will exert any excessive mechanical stress on the granulate, so that agglomeration of the individual particles of said granulate during its movement across the metal bath surface will be avoided. Any tendency of the individual particles to agglomerate may further be overcome by dusting on the granulate with powdered material, such as powdered graphite, petrol coke, Portland cement, sintered corundum or the like. Such material can be dusted on the granulate through pipe 31 in such a quantity that not only the surface of the particles is covered with said material, but that a sufficient quantity of said material is spread on the bath surface in order to form a layer wherein the individual granulate particles are embedded while being moved across the metal bath surface.

The melting temperature of the metal used for making the molten metal bath 32 must be adjusted to the temperature required for expanding the granulate. The surface temperature of a bath of molten aluminum is e.g. about 780–790° C. Thus, aluminum is preferred for the present purpose. During the passage across the surface of the metal bath 32, the individual particles of the granulate are expanded to a multiple of their original volume, so that near the right end of the bath, the latter will be covered with several layers of particles. Such accumulation is not detrimental, however, since the above mentioned dusting operations will avoid agglomeration of the particles.

The inflated granulate is pushed by the scraper 36 over the right upper edge of the tub 33 onto a conveyor belt 39. After cooling, the granulate may be stored or sorted in order to obtain material of graded particle size.

Alternatively, the granulate may be moved across the metal bath surface by means other than the scraper 36. Thus, it is possible to effect such movement of the particles by a continuous flow of the metal bath, e.g. by means of electrical induction.

The metal bath 32, together with the tub 33 and the scraper 36, is preferably enclosed in a furnace casing (not shown on the drawing), in order to assure a constant temperature of the bath surface.

The embodiment shown in FIG. 5 is particularly suitable for the large scale production of foamed glass granulate or pellets. The granulating device 40 of FIG. 5 may be of any known construction. A mixture of ground glass and a solution containing an alkali-metal silicate and an organic substance is fed into said granulating device 40 through a pipe 17'. The granulate particles or pellets leaving the delivery end 41 of the granulating device 40 may have any desired diameter within a range of from about 0.5 to 2 mm. Said granulate may either be stored prior to further processing or it may be directly fed into an expanding device formed by a rotary tubular furnace having an inclined tube 42 the upper end of which is mounted in a roller bearing 43, the lower end being provided with a toothed rim 44 which is in driving engagement with a pinion 45. The tube 42 rotates in the direction of the arrow 46. The tube 42 is enclosed by a heating jacket 47 for heating the tube to the desired temperature (e.g. electrically). The granulate coming from the delivery end 41 of the granulating device 40 is fed together with powdered material, such as powdered corundum or powdered clay (bentonite) coming from a bin 50 by means of a dispensing device 49 and a pipe 48, into the upper end of the tube 42. The powdered material is added in such a quantity that the granulate will be embedded therein when passing the tube 42, whereby agglomeration of the individual particles of the granulate is avoided. While passing the tube 42 towards said drying or roasting chamber may be formed by a rotary tube similar to the rotary tube 42.

The granulate leaving any of the two installations shown in FIGS. 4 and 5 may be cooled without any particular precautions on the open air, whereas foam glass produced in accordance with any of the conventional methods has to be cooled very slowly and carefully. The fact that the material produced according to the present invention is insensitive against thermal shocks results from the presence of a great number of micropores in the cell walls, which micropores provide for a certain degree of deformability of the cell walls. The said deformability of the cell walls absorbs thermal stresses, even those which result from rapid cooling of the material.

TABLE 1.—DATA OF THE CELLULAR GLASS BODIES PREPARED ACCORDING TO THE HEREIN SPECIFIED EXAMPLES

| Product of Example | Density (kg./l.)* | Flexural strength (kg./cm.²) | Compressive strength (kg./cm.²) | Heat conductivity (Kcal./m.h.°C.) | Gas permeability (nanoperm) | Water sorption (vol. percent) |
|---|---|---|---|---|---|---|
| 1 | 0.20 | 8 | 18 | 0.06 | 7 | 1.6 |
| 2 | 0.22 | 9 | 25 | | | |
| 3 | 0.22 | 9 | 20 | 0.065 | 22 | 2.1 |
| 4 | 0.23 | 11 | 25 | 0.07 | 16 | 1.7 |
| 5 | | 10 | 18 | 0.07 | 12 | 1.9 |
| 6 | 0.18 | 10 | 18 | 0.55 | 17 | 2.0 |
| 7 | 0.24 | 11 | 24 | 0.07 | 20 | 2.5 |
| 8 | 0.25 | 13 | 28 | 0.075 | 20 | 2.3 |
| 9 | 0.26 | 14 | 27 | 0.075 | 19 | 2.8 |
| 10 | 0.25 | 8 | 16 | 0.075 | 220 | 12.5 |
| 11 | 0.24 | 9 | 21 | 0.07 | 95 | 10.2 |
| 13 | 0.40 | 27 | 65 | 0.11 | 21 | 6.1 |

*Kg./l. means kilograms per liter. Kg./cm.² means kilograms per square centimeter.

its lower end, the granulate is heated to the desired inflating temperature. The addition of the powdered material will also prevent the individual particles of the granulate from adhering at the inner wall of the tube 42. If desired, the inner wall of the tube 42 may be lined with some suitable material which prevents adhering of the granulate particles at the temperature of expansion.

When passing through the rotating tube 42, the individual particles of the granulate are continuously inflated to a diameter which may be up to five times the diameter of the original particles. It was found that in the expanded state of the particles the tendency to agglomerate is particularly high. For this reason, a resilient knock-off device is provided in the lowermost third of the tube 42, said knock-off device consisting of a metal rod 51 mounted in a journal bearing 52 and being oscillated by means of a cam 53. The oscillatory movement of the rod 51 is indicated by the arrows 54. It was found that such knock-off device is more suitable than a stationary scraper which, by pressing on the granulate, would increase the tendency of the particles to agglomerate.

The length of the rotating tube 42 and its speed of rotation are adjusted to the desired period of treatment of the granulate. Said period of treatment will in most cases be less than about 5 minutes. In some cases, however, a heat treatment of 1 minute or even less will be sufficient.

The foamed glass granules or pellets leaving the rotating tube 42 are fed onto a chute 55 which, if desired, may be formed by a vibrating sieve in order to separate the granules or pellets from the dust or powder into which they were embedded while passing through the tube 42. If desired, the granules or pellets may be sorted in order to obtain material of graded diameters.

The installation shown in FIG. 5 may also be adjusted to various requirements. It is thus possible to provide a drying or roasting chamber between the granulating device 40 and the rotary tubular furnace 42. In this case the granulate can be dried or roasted at temperatures below 600° C. before they are subjected to inflation. If desired,

I claim:
1. A cellular, macroporous glass of uniform structure in which the cellular walls surrounding the macropores contain evenly distributed micropores, the average diameter of the micropores being less than about one tenth of the average diameter of the macropores.

2. A cellular glass according to claim 1, in which porous fillers selected from the group consisting of foamed mica, foamed perlite, cellular glass granules and foamed clay are imbedded in said cellular glass in quantities of from 5 to 80 percent by volume.

3. Foamed glass granulate according to claim 1 the individual particles of which are of substantially spherical shape and comprise an external skin the thickness of which is substantially the same as the thickness of the cell walls of the macropores, said cell walls comprising micropores.

4. A composite matter comprising foamed glass granulate according to claim 3, and organic foam material, the individual particles of said granulate being imbedded in said foam material, said foam material filling the interstices between said individual particles.

5. In a method of making cellular glass, the steps comprising thoroughly mixing finely ground glass powder with an aqueous solution containing an alkali-metal silicate and an organic substance selected from the group consisting of polyhydric alcohols, carbohydrates, precondensates of urea-formaldehyde and phenol-formaldehyde and bituminous emulsions;

submitting the resulting mixture to a preliminary roasting process at temperatures between about 200° C. to 300° C. for a period of time necessary to cover said ground glass particles with a solid vitreous crust of alkali-metal silicate having embedded therein particles of said organic substance, said covered ground glass particles remaining substantially unsintered and therefore freely movable;

rapidly heating said roasted material to its softening temperature to inflate the mass; and allowing the inflated mass to cool.

6. A method according to claim 5, wherein a glass powder is used, the maximal particle size of which is about 0.5 mm. and which contains at least 10 percent by weight of particles having a grain size below 0.035 mm.

7. A method according to claim 5, wherein about 100 parts by weight of glass powder are mixed with about 4 to 30 parts by weight of a concentrated aqueous solution of sodium silicate and about 0.3–10 parts by weight of said organic substance.

8. A method according to claim 5, wherein about 0.01 to 0.50 percent by weight of a wetting agent are added to said mixture, said wetting agent remaining stable in alkaline solution.

9. A method according to claim 5, wherein said roasting process is carried out by bringing said mixture to a temperature of about 500° C. within about 1 to 10 minutes, whereupon it is allowed to cool.

10. A method according to claim 5, wherein the roasted material is ground to a particle size of less than 0.5 mm. before it is submitted to further treatment.

11. A method according to claim 5, wherein the roasted material is rapidly heated to a temperature of between about 660° and 790° C. to inflate the mass, whereupon it is allowed to cool down slowly.

12. A method according to claim 5, wherein the roasted material is further mixed with a member of the class consisting of untreated glass powder, ground cellular glass, basalt powder and ground slag before inflating said mass.

13. A method according to claim 5, wherein the roasted material is further mixed with up to about 60 percent by volume of a member of the group consisting of inflated mica, perlite, clay and cellular glass granules before inflating said mass.

14. A method of making cellular glass according to claim 5, said method comprising the steps of mixing 100 parts by weight of glass powder with 1–3 parts by weight of a solution containing 150–350 parts by weight of an alkali-metal silicate, 10–30 parts by weight of an organic substance and about 100 parts by weight of water, submitting the resulting mixture to a preliminary roasting process to obtain a mass consisting of glass grains covered with a layer of solid alkali-metal silicate having embedded therein particles of said organic substance, said glass grains being agglomerated, grinding the agglomerate and inflating it by rapid heating to a temperature of between about 600 and 790° C.

15. A method of making individual foamed glass particles according to claim 5, said method comprising the steps of thoroughly mixing finely ground glass with a solution containing an alkali-metal silicate and an organic substance selected from the group consisting of polyhydric alcohols, carbohydrates, precondensates of urea-formaldehyde and phenol-formaldehyde and bituminous emulsions, disintegrating the resulting mixture while still in a moist state, forming small pellets by extruding the mixture with the help of a screw through a multiple orifice die and cutting the emerging extrusion apart, roasting said pellets, and subjecting the pellets to inflation by heating them to a temperature of about 700–900° C.

16. A method according to claim 14, wherein said mixture is produced by mixing 100 parts by weight of glass powder with 1–3 parts by weight of a solution containing 150–350 parts by weight of an alkali-metal silicate, 10–30 parts by weight of an organic substance and about 100 parts by weight of water.

17. A method as claimed in claim 15, wherein the pellets are dusted on with powdered material in order to prevent agglomeration.

References Cited by the Examiner

UNITED STATES PATENTS

| | | | |
|---|---|---|---|
| 2,136,096 | 11/1938 | Benner et al. | 65—22 |
| 2,553,759 | 5/1951 | Geiger | 106—41 |
| 2,691,248 | 10/1954 | Ford | 161—106 |
| 3,184,371 | 5/1965 | Thurnstein | 106—75 |

FOREIGN PATENTS 336,318  10/1930  Great Britain.

DONALL H. SYLVESTER, *Primary Examiner.*

G. R. MYERS, *Assistant Examiner.*